US012574686B2

(12) United States Patent
Vuine

(10) Patent No.: US 12,574,686 B2
(45) Date of Patent: Mar. 10, 2026

(54) LOUDSPEAKER ASSEMBLY

(71) Applicant: PSS BELGIUM NV, Dendermonde (BE)

(72) Inventor: Fabian Vuine, Dendermonde (BE)

(73) Assignee: PSS BELGIUM NV, Dendermonde (BE)

( * ) Notice: Subject to any disclaimer, the term of this patent is extended or adjusted under 35 U.S.C. 154(b) by 95 days.

(21) Appl. No.: 18/566,895

(22) PCT Filed: May 27, 2022

(86) PCT No.: PCT/EP2022/064404

§ 371 (c)(1),
(2) Date: Dec. 4, 2023

(87) PCT Pub. No.: WO2022/253702

PCT Pub. Date: Dec. 8, 2022

(65) Prior Publication Data

US 2024/0284114 A1 Aug. 22, 2024

(30) Foreign Application Priority Data

Jun. 4, 2021 (GB) ...................................... 2108015
Oct. 25, 2021 (GB) ...................................... 2115299

(51) Int. Cl.
*H04R 9/06* (2006.01)
*H04R 1/02* (2006.01)
(Continued)

(52) U.S. Cl.
CPC ............... *H04R 9/06* (2013.01); *H04R 1/023* (2013.01); *H04R 1/025* (2013.01); *H04R 7/12* (2013.01);
(Continued)

(58) Field of Classification Search
CPC .......... H04R 9/06; H04R 1/023; H04R 1/025; H04R 7/12; H04R 7/22; H04R 2307/025; H04R 2400/11
See application file for complete search history.

(56) References Cited

U.S. PATENT DOCUMENTS 3,862,376 A * 1/1975 White .................... H04R 3/002
381/404
4,312,118 A 1/1982 Saik
(Continued)

FOREIGN PATENT DOCUMENTS

CN 103686547 A 3/2014
DE 202004014927 U1 2/2005
(Continued)

OTHER PUBLICATIONS

USPTO, Final Office Action for corresponding U.S. Appl. No. 18/771,637, dated Dec. 20, 2024, 13 pages.
(Continued)

*Primary Examiner* — Sunita Joshi
(74) *Attorney, Agent, or Firm* — NK Patent Law

(57) ABSTRACT

A loudspeaker assembly includes: a chassis; a loudspeaker, including a drive unit and a diaphragm. The diaphragm includes a body portion and inner and outer suspension portions, wherein the body portion extends between the inner and outer suspension portions. The drive unit moves the body portion along a movement axis. The body portion has a front face facing forwards and a rear face facing rearwards parallel to the movement axis. The outer suspension portion is integral with the body portion, and is attached to the chassis at a first attachment location such that the body portion is suspended from the chassis. The inner suspension portion is integral with the body portion, and is attached to the chassis at a second attachment location such that the body portion is suspended from the chassis. The first and
(Continued)

second attachment locations have separate first and second positions along the axis, respectively.

18 Claims, 8 Drawing Sheets

(51) Int. Cl.
*H04R 7/12* (2006.01)
*H04R 7/22* (2006.01)

(52) U.S. Cl.
CPC ......... *H04R 7/22* (2013.01); *H04R 2307/025* (2013.01); *H04R 2400/11* (2013.01)

(56) References Cited

U.S. PATENT DOCUMENTS

| | | | |
|---|---|---|---|
| 8,217,767 | B2 | 7/2012 | Nakayama |
| 10,406,976 | B2 | 9/2019 | Bednar |
| 2002/0061117 | A1 | 5/2002 | Takewa |
| 2006/0249327 | A1 | 11/2006 | Sato |
| 2008/0013781 | A1 | 1/2008 | Sagren |
| 2012/0194328 | A1 | 8/2012 | Nakayama |
| 2013/0233640 | A1 | 9/2013 | Humphreys |
| 2018/0220227 | A1* | 8/2018 | Tanabe ................. H04R 1/2834 |
| 2019/0166445 | A1 | 5/2019 | Itano |
| 2019/0200110 | A1 | 6/2019 | Kajihara |
| 2020/0070719 | A1 | 3/2020 | Werner |
| 2021/0385580 | A1 | 12/2021 | Kajiwara |
| 2022/0248142 | A1* | 8/2022 | Gheldof ................... H04R 9/06 |
| 2022/0264226 | A1 | 8/2022 | Sunamoto et al. |

FOREIGN PATENT DOCUMENTS

| | | | | |
|---|---|---|---|---|
| EP | 2271137 | A1 | 1/2011 | |
| EP | 1515584 | B1 | 8/2013 | |
| FR | 2983025 | A1 | 5/2013 | |
| GB | 640824 | A | 7/1950 | |
| GB | 1232089 | A | 5/1971 | |
| GB | 1491080 | A | 11/1977 | |
| GB | 2315185 | A | 1/1998 | |
| JP | H02290400 | A | 11/1990 | |
| JP | H06165289 | A | 6/1994 | |
| JP | 2002232990 | A | 8/2002 | |
| JP | 2003219493 | A | 7/2003 | |
| JP | 2006041783 | A | 2/2006 | |
| JP | 2010258357 | A | 11/2010 | |
| JP | 2010258537 | A | 11/2010 | |
| JP | 4855213 | B2 | 1/2012 | |
| JP | 4898957 | B2 | 3/2012 | |
| JP | 2013201484 | A * | 10/2013 | .............. H04R 7/18 |
| JP | 2014220670 | A | 11/2014 | |
| JP | 2020036232 | A | 3/2020 | |
| WO | 2013141369 | A1 | 9/2013 | |
| WO | 2013141373 | A1 | 9/2013 | |
| WO | 2020030009 | A1 | 2/2020 | |

OTHER PUBLICATIONS

USPTO, Non-Final Office Action for corresponding U.S. Appl. No. 18/771,637 dated Sep. 10, 2024, 12 pages.
USPTO, Non-Final Office Action for corresponding U.S. Appl. No. 18/566,866 dated Sep. 23, 2024, 15 pages.
ISA/EPO; International Search Report and Written Opinion for corresponding International Application No. PCT/EP2022/064404, dated Oct. 14, 2022, 16 pages.
Anonymous: "Young's Modulus: Tensile Elasticity Units, Factors & Material Table", Omnexus, Jan. 1, 2022 (Jan. 1, 2022), accessed Nov. 2, 2023, from URL: https://omnexus.specialchem.com/polymer-properties/properties/young-modulus.
USPTO, Final Office Action for corresponding U.S. Appl. No. 18/566,866, dated Mar. 27, 2025, 14 pages.
USPTO, Non-Final Office Action for corresponding U.S. Appl. No. 18/771,637, dated Apr. 15, 2025, 13 pages.
EPO, Office Action for corresponding European Patent Application No. 22733541.1, dated Nov. 17, 2025, 7 pages.
Newell, Philip, et al. "Loudspeakers for music recording and reproduction", First edition 2007, http://93.48.145.201/literature/Loudspeakers%20For%20music%20recording%20and%20reproduction.pdf, 423 pages.

* cited by examiner

LOUDSPEAKER ASSEMBLY

CROSS-REFERENCE TO RELATED APPLICATIONS

This application is a U.S. National Phase Application of International Patent Application No. PCT/EP2022/064404, filed on 27 May 2022, which claims priority to GB2108015.5 filed 4 Jun. 2021 and GB2115299.6 filed 25 Oct. 2021.

FIELD OF THE INVENTION

The present invention relates to loudspeaker assemblies.

BACKGROUND

Traditional loudspeakers have a diaphragm having a generally conical shape, suspended from a chassis by two suspension elements. These two suspension elements include a surround which connects an outer periphery of the diaphragm to the chassis, and a damper (also known as a spider) which is typically a ring-shaped element with multiple circumferential corrugations which form a wave pattern that connects an inner periphery of the diaphragm to the chassis via a voice coil former.

In such an arrangement, the two suspension elements allow for axial motion of the diaphragm (and other moving parts of the loudspeaker) while preventing rocking or radial motion. Most loudspeakers above a size of about 5 cm in diameter are built in this way as they typically have large excursion capabilities.

Loudspeaker designed for small excursions such as high frequency tweeters, microspeakers or headphone drivers are typically built without a damper. This makes them prone to rocking. For such loudspeakers, it is common for the surround to be wide and in the same plane as the connection between dome and voice coil. An exception are cone-dome tweeters where there is a conical portion extending from the diaphragm-voice coil connection to the frame. Such tweeters are designed for minimal stroke and typically used for frequencies above 4 kHz.

Other loudspeakers that avoid using a damper include loudspeakers that need a relatively large radiating surface (and hence make use of a cone), while at the same time having a small excursion requirement (and hence the use of a damper is not justified). In this case, the loudspeaker may look like a large cone-dome speaker. Such loudspeakers tend to be prone to rocking leading to undesired distortion and failure.

Ring radiators are another type of loudspeaker, described in many publications such as U.S. Pat. No. 6,320,972B1. In ring radiators, there is a half-roll suspension connecting the diaphragm to a fixed part of the loudspeaker on a diameter smaller than the voice coil diameter. These designs also incorporate a half-roll suspension fixing the diaphragm on a diameter larger than the voice coil leaving an annular portion to radiate. Ring radiators generally have the two suspensions attached to a fixed-part of the loudspeaker in the same plane which is normal to the movement axis of the loudspeaker, with a relatively heavy voice coil suspended below via a voice coil former. However, ring radiators are typically subject to large 2nd order harmonic distortion as the moving half-roll suspensions change the radiating surface area with displacement (since all radiating surface area is part of a roll suspension and not of a body which has piston-like movement). Ring radiators are also prone to rocking.

The present inventor has observed that there is a need for a loudspeaker allowing for medium to low frequency reproduction using a comparably large cone without use of a damper, yet without being prone to rocking. Such a loudspeaker may, for example, be well suited for use on the outside of a vehicle intended for Acoustic Vehicle Alerting System ("AVAS") applications. Such a loudspeaker may also find use in other context.

In some jurisdictions, a loudspeaker for use in a vehicle alerting system is legally required to have a combined, A-weighted SPL (sound pressure level) in the ⅓$^{rd}$ octave frequency bands 2 khz, 2.5 kHz and 3.15 kHz to be no less than 105 dB measured under anechoic conditions in 2 m distance on the principle axis of the device. See, for example, Regulation No 28 of the Economic Commission for Europe of the United Nations (UN/ECE)—"Uniform provisions concerning the approval of audible warning devices and of motor vehicles with regard to their audible signals."

The inventive loudspeaker is well suited for use as an audible warning device on the outside of a vehicle when playing back a suitable signal.

The present invention has been devised in light of the above considerations.

SUMMARY OF THE INVENTION

In a first aspect, the present invention may provide:

A loudspeaker assembly, the loudspeaker assembly including:

- a chassis;
- a loudspeaker, including a drive unit and a diaphragm;
- wherein the diaphragm includes a body portion, an inner suspension portion and an outer suspension portion, wherein the body portion which extends between the inner suspension portion and the outer suspension portion;
- wherein the drive unit is configured to move the body portion along a movement axis, wherein the body portion has a front face that faces in a forwards direction parallel to the movement axis and a rear face that faces in a rearwards direction parallel to the movement axis;
- wherein the outer suspension portion is integral with the body portion, and is attached to the chassis at a first attachment location such that the body portion is suspended from the chassis via the outer suspension portion, wherein the first attachment location has a first position along the movement axis;
- wherein the inner suspension portion is integral with the body portion, and is attached to the chassis at a second attachment location such that the body portion is suspended from the chassis via the inner suspension portion, wherein the second attachment location has a second position along the movement axis;
- wherein the first position along the movement axis is separated from the second position along the movement axis.

Having a diaphragm which includes a body portion which is integral with an inner suspension portion and an outer suspension portion helps to save on cost and complexity (e.g. fewer gluing operations, fewer components), resulting in a loudspeaker assembly that is cheap and simple to produce, and helps to inhibit water ingress at joints (particularly useful if the diaphragm is made of waterproof material and the loudspeaker is for use outdoors). Moreover, by having the first position and second position separated along the movement axis, which means that the location at which the outer suspension portion is attached to the chassis is separated from the location at which the inner suspension portion attaches the chassis (in a direction parallel to the movement axis), it is possible for the loudspeaker assembly to inhibit problematic rocking motions, without the need for a damper.

For avoidance of any doubt, the body portion may have various shapes.

In some examples, the body portion may have a geometric shape to improve stiffness.

For example, the body portion may be a cone portion having a generally conical shape, a dome portion having a dome shape, or may have some other shape, e.g. more complex shapes which may include one or more dished portions, ribs, folds, pimples and/or dimples.

Preferably, the body portion has depth in a direction parallel to the movement axis, since this helps to facilitate the first position being separated from the second position along the movement axis. Though it is possible to envisage embodiments in which the body portion is flat, and the first position being separated from the second position along the movement axis by having suitably shaped inner and/or outer suspension portions.

Preferably, the body portion is a cone portion, having a generally conical shape.

The cone portion may be an open cone having a cone opening angle in the range 60° to 160°. As an "open cone", we mean a cone with its 'tip' missing (sometimes referred to as a frusto-cone). Accordingly the cone opening angle is measured as the angle between side walls of the cone-shaped portion. Preferably the cone opening angle is in the range 90° to 130°. It will be recognised that preferably those side walls of the cone-shaped portion are straight/flat; that is, that the cone angle does not vary in the radial direction.

The cone portion may have a longest dimension in a direction perpendicular to the movement axis D_cone in the range 40 mm to 180 mm.

Preferably a concave face of the body portion faces in the forward direction (i.e. provides the front face of the body portion), with a convex face of the body portion facing in the rearwards direction (i.e. providing the rear face of the body portion).

However, it is also possible for a convex face of the body portion to face in the forward direction (i.e. to provide the front face of the body portion), with a concave face of the body portion facing in the rearwards direction (i.e. providing the rear face of the body portion). In this case, if the body portion is a cone portion, the cone portion may be described as an "inverted" cone portion, since it is more common for the concave face of the cone portion to face in the forward direction.

Preferably, the body portion is substantially rigid, e.g. such that it substantially retains its shape as it is moved along the movement axis by the drive unit (e.g. during normal operation of the loudspeaker).

Thus, preferably, the body portion is configured to be moved by the drive unit with piston-like movement, i.e. with each part of the body portion moving, in effect, the same amount as each other part of the body portion. This contrasts with, for example, the inner suspension portion and outer suspension portion which are preferably configured to deform (e.g. bend) as the body portion is moved along the movement axis by the drive unit.

Preferably, the chassis is substantially rigid, e.g. such that it substantially retains its shape as the body portion is moved along the movement axis by the drive unit (e.g. during normal operation of the loudspeaker). This also contrasts with, for example, the inner suspension portion and outer suspension portion which are preferably configured to deform (e.g. bend) as the body portion is moved along the movement axis by the drive unit.

Preferably, the first position along the movement axis is separated from the second position along the movement axis by a distance (h) of at least 10 mm, preferably at least 15 mm. Such a distance helps to inhibit problematic rocking motions, without the need for a damper.

In some examples, the outer suspension portion and inner suspension portion are the only suspension elements via which the body portion is suspended from the chassis. For example, a damper (or spider, as they are sometimes known) as is typically used in most loudspeaker designs, may be omitted from the loudspeaker according to the first aspect. This is made possible by the separation of the first and second locations along the movement axis, which helps provide stabilisation against rocking which is typically provided by the damper.

The outer suspension may be attached to the chassis at a plurality of locations, in which case the first attachment location may be taken to be any of these locations.

The inner suspension portion may be attached to the chassis at a plurality of locations, in which case the second attachment location may be taken to be any of these locations.

In some examples, the outer suspension portion and the chassis are separate elements, e.g. with the outer suspension portion being attached to the chassis at one or more first attachment surfaces on the outer suspension portion. In such examples, the first attachment location may be taken to be any location on the first attachment surface(s). For avoidance of any doubt, the first attachment surface(s) may include locations having different positions along the movement axis.

In some examples, the inner suspension portion and the chassis are separate elements, e.g. with the inner suspension portion being attached to the chassis at one or more second attachment surfaces on the inner suspension portion. In such examples, the second attachment surface may be taken to be any location on the second attachment surface(s). For avoidance of any doubt, the second attachment surface(s) may include locations having different positions along the movement axis.

In some examples, the diaphragm and the chassis are separate elements, e.g. with the outer suspension portion being attached to the chassis at one or more first attachment surfaces on the outer suspension portion, and with the inner suspension portion being attached to the chassis at one or more second attachment surfaces on the inner suspension portion.

In some examples where the outer suspension portion and the chassis are separate elements, the first attachment location may be taken to be a location within the first attachment surface on the outer suspension portion at which there is a boundary between a clamped region of the outer suspension portion (whose movement is clamped by attachment to the chassis as the body portion is moved along the movement axis by the drive unit) and a non-clamped region of the outer suspension portion (which is able to move as the body portion is moved along the movement axis by the drive unit).

In some examples where the inner suspension portion and the chassis are separate elements, the second attachment location may be taken to be a location within the second attachment surface on the inner suspension portion at which there is a boundary between a clamped region of the inner suspension portion (whose movement is clamped by attachment to the chassis as the body portion is moved along the movement axis by the drive unit) and a non-clamped region of the inner suspension portion (which is able to move as the body portion is moved along the movement axis by the drive unit).

The diaphragm and the chassis need not be separate elements in all examples.

For example, in some examples, the diaphragm may include a chassis portion, which is part of the chassis. For example, the chassis portion of the diaphragm may be integrally formed with the outer suspension portion, i.e. such that the body portion is suspended from the chassis portion by the outer suspension portion. In order to be considered part of the chassis, the chassis portion may have to be substantially rigid, e.g. such that it substantially retains its shape as the body portion is moved along the movement axis by the drive unit (e.g. during normal operation of the loudspeaker). The chassis portion may be attached to one or more other elements (e.g. the magnet unit) which, together with the chassis portion, form the chassis.

In examples in which the diaphragm includes a chassis portion, wherein the chassis of the diaphragm is integrally formed with the outer suspension portion, the first attachment location (at which the outer suspension portion attaches to the chassis) may be a location at a boundary between the outer suspension portion (e.g. which deforms as the body portion is moved along the movement axis by the drive unit) and the chassis portion (e.g. which substantially retains its shape as the body portion is moved along the movement axis by the drive unit).

The body portion may extend between a first plane which is perpendicular to the movement axis and which passes through the first attachment location, and a second plane which is perpendicular to the movement axis and which passes through the second attachment location.

The body portion may include a voice coil connection portion which is shaped to facilitate alignment and/or an attachment between the body portion and a voice coil former. The voice coil connection portion may have the form of an annular feature, e.g. an annular surface or surfaces, configured to have the voice coil former attached thereto (e.g. by adhesive).

A boundary between the body portion and the outer suspension portion may be referred to as an outer perimeter of the body portion. A boundary between the body portion and the inner suspension portion may be referred to as an inner perimeter of the body portion.

The outer perimeter and/or inner perimeter of the body portion may be circular.

In some examples, the effective radiating area of the body portion projected onto a plane perpendicular to the movement axis may be larger than the sum of the effective radiating area of the inner suspension portion and the effective radiating area of the outer suspension portion projected onto the same plane. In other words, the body portion is preferably dominant in producing sound compared with the inner and outer suspension portions.

The effective radiating area of the body portion may be taken as the area of the body portion as projected onto a plane perpendicular to the movement axis.

If the inner and outer suspension portions are circular half-roll suspensions, the effective radiating area of the diaphragm (inner suspension portion, body portion outer suspension portion) may be taken as the area of an annular region of the diaphragm which extends from a middle of the inner half roll suspension to a middle of the outer half roll suspension, as projected onto a plane perpendicular to the movement axis.

Alternatively (e.g. for more complex geometries), the effective radiating area of the body portion, inner suspension portion and outer suspension portion may be calculated by, for example, the technique described in https://www.klippel.de/fileadmin/klippel/Files/Know_How/Application-_Notes/AN_32_Effective_Radiation_Area.pdf.

The drive unit may be an electromagnetic drive unit that includes a magnet unit configured to produce a magnetic field in an air gap, and a voice coil attached to the diaphragm, wherein the voice coil is configured to sit in the air gap when the diaphragm is at rest. When the loudspeaker is in use, the voice coil may be energized (have a current passed through it) to produce a magnetic field which interacts with the magnetic field produced by the magnet unit and which causes the voice coil (and therefore the diaphragm) to move relative to the magnet unit. Such drive units are well known.

The voice coil may be attached to the diaphragm by a voice coil former.

In some examples where the outer suspension portion is attached to the chassis at one or more first attachment surfaces on the outer suspension portion, the one or more first attachment surfaces on the outer suspension portion may attach to the chassis at one or more first landing surfaces on the chassis.

In some examples, the chassis may include a housing. The first landing surface(s) may be on the housing, without necessarily involving use of a frame. The housing may be acoustically closed (in which case it may be described as forming a loudspeaker cabinet).

In some examples, the chassis may include a frame, wherein the frame is configured to be mounted in a separate mounting body (such as a loudspeaker cabinet, such as a car door). The mounting cabinet may be acoustically closed. The first landing surface(s) may be on the frame. The frame may be acoustically open.

For avoidance of any doubt, examples can be envisaged in which neither a housing or a frame is present. For example, in some examples the chassis may include only the magnet unit and a chassis portion of the diaphragm. In other examples, the chassis may include only the magnet unit.

In some examples, the magnet unit may be configured to be mounted in a separate mounting body (in which case a housing and/or frame may be omitted), e.g. via a thread on the magnet unit.

In some examples where the inner suspension portion is attached to the chassis at one or more second attachment surfaces on the inner suspension portion, the one or more second attachment surface on the inner suspension portion may attach to the chassis at one or more second landing surfaces on the chassis.

In some examples, the chassis may include a magnet unit of the drive unit.

In some examples, the second landing surface(s) may be on the magnet unit.

In some examples, the chassis may include a grille positioned in front of the diaphragm.

A rear face of the grille may face in the rearwards direction toward the front face of the body portion, and a front face of the grille may face in the forwards direction. The grille is preferably configured to permit sound produced by the front face of the body portion to pass through the grille when the loudspeaker is in use, and to inhibit the ingress of water incident on the front face of the grille from entering into a space enclosed between the rear face of the grille and the front face of the body portion.

In some examples where the inner suspension portion is attached to the chassis at one or more second attachment surfaces on the inner suspension portion, and at one or more second landing surfaces on the chassis, the second landing surface(s) may be on the grille. Preferably, the grille is attached (preferably rigidly attached) to another part of the chassis (e.g. a magnet unit, a frame, a housing) via an element (e.g. a pin) that passes through (e.g. pierces, or passes through a pre-formed hole in) the diaphragm, preferably through (e.g. pierces, or passes through a pre-formed hole in) the inner suspension portion of the diaphragm. This allows the grille to be strengthened in the vicinity of a centre of the diaphragm (where loudspeaker grilles are typically lacking in rigidity). This can help improve the rigidity of the loudspeaker assembly as a whole.

The element (e.g. pin) that attaches the grille to another part of the chassis may also be viewed as part of the chassis.

The outer suspension portion may comprise a corrugation which extends around the outer perimeter of the body portion of the diaphragm. Preferably the corrugation is convex with respect to the forward direction. But the corrugation may be concave with respect to the forward direction.

The corrugation may be curved when viewed in a cross-section parallel to the movement axis. The curve may have circular curvature (i.e. include a section of a circle). The body portion of the diaphragm may extend in a tangential direction (with respect to the circular curvature of the corrugation) from the corrugation at a boundary between the outer suspension portion and the body portion. This may afford a smooth transition between the corrugation and the body portion of the diaphragm.

The first position along the movement axis (of the attachment surface on the outer suspension portion) may be 1 mm or more, preferably 3 mm or more, or even 5 mm or more, rearwards of the position of a most forward location on the corrugation along the movement axis, when the diaphragm is at rest. The corrugation may thus have a rearward slope towards the first landing surface, when the diaphragm is at rest.

In some examples, the longest dimension of a non-clamped region of the outer suspension portion in a direction perpendicular to the movement axis, which may be referred to as D_clamp, may be in the range 50 to 200 mm.

Preferably, D_clamp is 3*VCd/2 or more, more preferably 2*VCd or more, where VCd is a diameter of a voice coil included in the drive unit.

The inner suspension portion may comprise a corrugation which extends around the movement axis. Preferably the corrugation is convex with respect to the forward direction.

The corrugation may be curved when viewed in a cross-section parallel to the movement axis. The curve may have circular curvature (i.e. include a section of a circle).

In some examples, a Young's modulus of the material of the diaphragm may be in the range 0.5 GPa to 15 GPa.

In some examples, e.g. where the loudspeaker is for use in an AVAS system or as audible warning device playing back a suitable signal, a Young's modulus of the material of the diaphragm may be in the range 2 to 15 GPa, or even 8 to 15 GPa.

For many materials (for example where woven fibres are included), the Young's modulus may vary depending on the direction of measurement. Accordingly in some embodiments that material has the Young's modulus mentioned above in at least one direction of measurement; and in some examples in all directions of measurement.

In a woven material, the Young's modulus and tensile strength of the material of the diaphragm may for example be determined by measurements according to ISO 527-1 from cut samples of the rectangular size 30 mm×5.3 mm of the manufactured diaphragm. A first sample cut with warp and weft aligning with the cut direction and a second sample cut with warp and weft at 45° relative to the cut direction.

The diaphragm may be thermoformed, or vacuum formed, from a thermoplastic for example.

Suitable diaphragm materials may include but are not limited to:

- Polypropylene, optionally with one or more filler materials such as glass fibers, talcum, MICA etc. The polypropylene may be uniaxially or biaxially oriented
- Polycarbonate, optionally with one or more filler materials
- Acrylonitril-butadieen-styreen, optionally in blends with other materials such as PC-ABS
- Polyethylene terephthalate
- Polyethylene terephthalate uniaxially or biaxially oriented (e.g. Mylar®)
- Polyvinylchloride
- Polyethylene naphthalate
- Polyetherimide
- Polyether ether ketone
- Pressed and non-pressed paper, e.g. with varying fibre content in the inner and/or outer suspension portions
- Composite materials from a single ply of woven material in a thermoset resin such as phenolic resin or epoxy resin.

If the diaphragm material is a thermoplastic, it maybe desired to achieve at least partial crystallization in the body portion while keeping the suspension portions in an amorphous state, such as described in EP2271137A1

Whichever material is chosen, the material should be configured to provide the diaphragm with enough stiffness to permit piston-like movement of the body portion (retaining its shape in motion) with flexibility to allow the inner and outer suspension portions to accommodate such piston-like movement.

It will be apparent that, while the diaphragm (body portion and the inner and outer suspension portions) should be formed of a single piece of material (that is, with the body portion and the inner and outer suspension portions being integral with each other), there may be some manufacturing variation in properties of that material across the body portion and the inner and outer suspension portions.

In some examples, the material of the diaphragm has a substantially uniform or homogenous thickness and Young's modulus.

In some examples, the thickness of the material of the diaphragm may be in the range 0.03 to 1 mm, for example 0.03 to 0.6 mm.

It will be recognised that the thickness of the material corresponds to its smallest dimension.

In some embodiments, the material of the diaphragm may be thicker in the body portion compared with the inner suspension portion and/or outer suspension portion, e.g. so as to increase stiffness of the body portion relative to the inner and/or outer suspension portions.

For example, the diaphragm may have a thickness in the inner suspension portion and/or outer suspension portion that is in the range 30%-100% of a thickness in body portion. In some examples, the diaphragm may have a thickness in the inner suspension portion and/or outer suspension portion that is in the range 30%-80% of a thickness in body portion.

However, there are ways of increasing stiffness of the body portion relative to the inner and/or outer suspension portions, other than making the diaphragm thicker in the body portion than in the inner and/or outer suspension portions.

For example, the diaphragm may have a generally conical shape (as already discussed, above).

For example, the diaphragm may have one or more stiffening elements (e.g. ribs, folds, pimples and/or dimples) formed in the body portion, e.g. so as to increase the stiffness of the body portion relative to the inner and/or outer suspension portions.

For example, the inner and/or outer suspension portions may have a different state than the body portion, e.g. amorphous vs crystalline.

For example, if the diaphragm is made of paper, the diaphragm may have a different fibre content in the inner and/or outer suspension portions compared with the body portion.

For example, if the diaphragm is thermo formed or vacuum formed, the drawing direction can be chosen to increase stiffness of the body portion relative to the inner and/or outer suspension portions. For example, if the diaphragm includes a frusto-cone shape, the diaphragm may be thermo formed with an apex of the frusto cone downwards so as to have the most strain, and therefore the smallest thickness, at the inner suspension portion, to increase its compliance.

For example, if the diaphragm is made of a thermoset material, the diaphragm may have a different resin mixture in the inner and/or outer suspension portions compared with the body portion.

But for simplicity, the diaphragm should nonetheless be made such that the body portion is integral with the inner and outer suspension portions (e.g. rather than, for example, an overmoulding process in which In some examples, the inner and/or outer suspension portion includes deformation formations (e.g. pleats) configured to facilitate deformation of the inner and/or outer suspension portion as the body portion is moved along the movement axis.

A loudspeaker assembly according to the invention may be configured for use in potentially any frequency range, depending on the intended application.

If the loudspeaker assembly is configured for use in an AVAS system or as audible warning device playing back a suitable signal, the loudspeaker may have a resonance frequency within the range 400 Hz to 800 Hz, for example. But other resonance frequencies are of course possible.

The loudspeaker assembly may be configured for use with the front face of the body portion exposed to an outdoor environment (noting that a grille may be positioned in front of the diaphragm and thus be between the front face of the body portion and the outdoor environment).

The present loudspeaker may be particularly well suited to an outdoor environment because the integrally formed body portion, inner suspension portion and outer suspension portion help to prevent water ingress in joints.

The diaphragm may be formed of a waterproof material, which may further assist with inhibiting water ingress.

The loudspeaker assembly may be configured for use in a vehicle with the front face of the body portion exposed to an outdoor environment.

The loudspeaker assembly may form part of an Acoustic Vehicle Alerting System (AVAS).

The loudspeaker assembly might be used as audible warning device when playing back a suitable signal.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 1A:
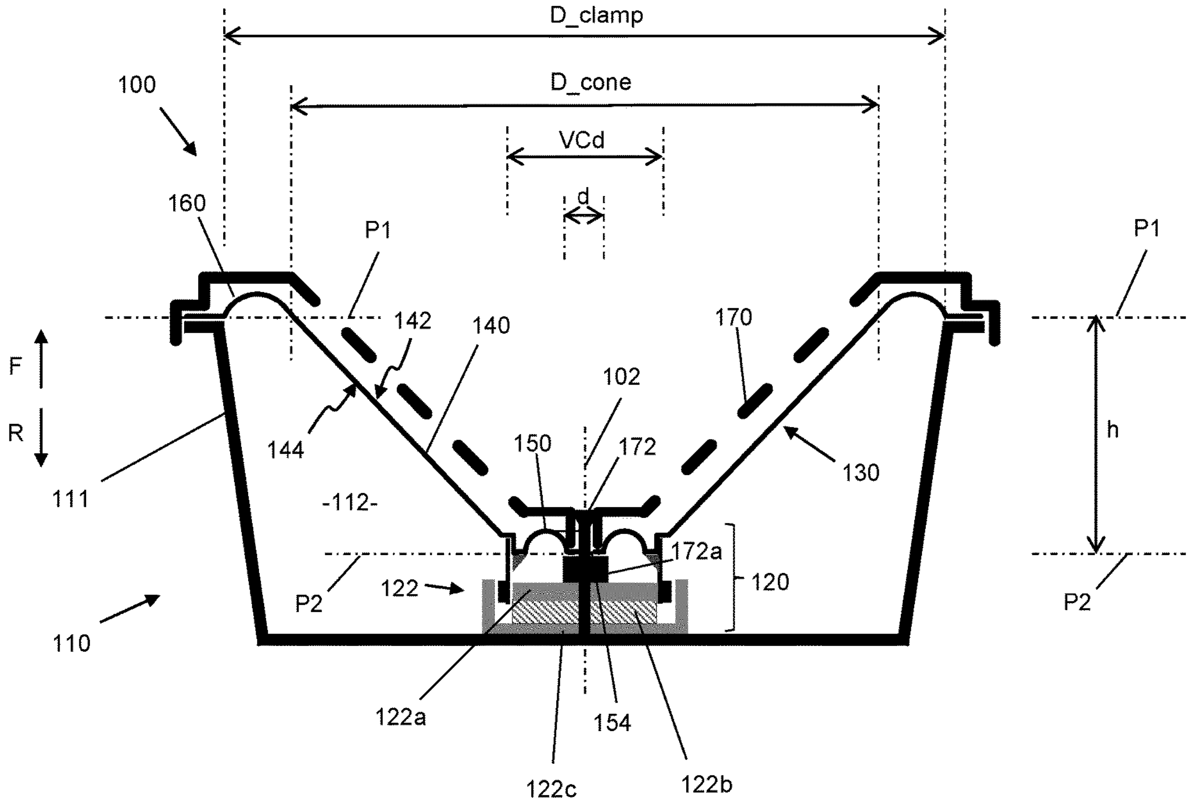
FIGS. 1*a-d* show a first loudspeaker assembly.
Figure 1B:
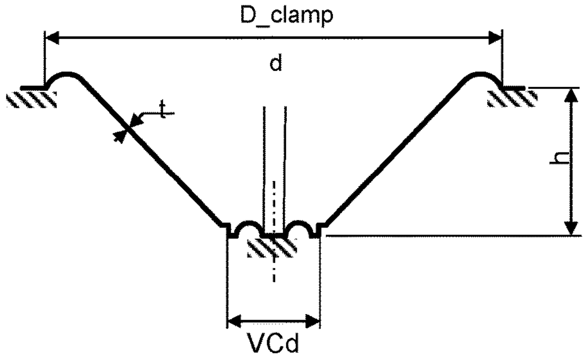
Figure 1C:
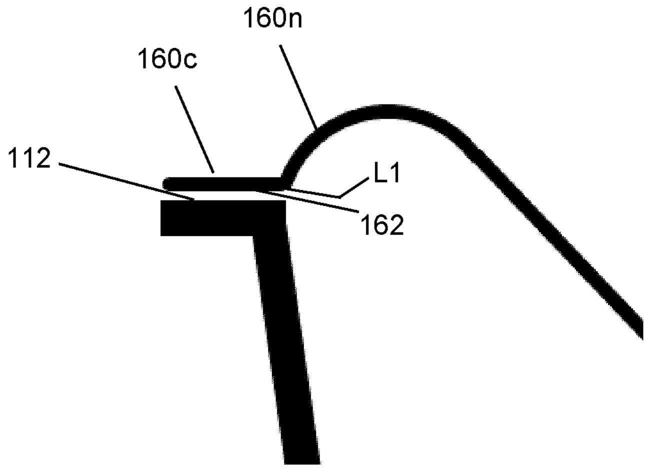

FIGS. 1*a-c* show a first loudspeaker assembly 100 according to the present invention.

The loudspeaker assembly 100 includes a chassis 110, which is substantially rigid.

In this example, the chassis 110 includes a housing 111 and a magnet unit 122. The housing 111 is acoustically closed and (together with a diaphragm 130) encloses a volume 112.

The loudspeaker assembly 100 also includes a drive unit 120, and the diaphragm 130. The drive unit 120 and diaphragm 130 can together be viewed as a loudspeaker.

The diaphragm includes a body portion 140 which extends between an inner suspension portion 150 and an outer suspension portion 160. The body portion 140 has a generally conical shape with a concave face of the cone portion facing in the forward direction F, and is referred to as cone portion 140 below.

FIG. 1*b* shows the diaphragm 130 with certain measurements thereof (discussed in more detail below).

FIG. 1*c* shows a close up of the first loudspeaker assembly 100 in the vicinity of the outer suspension portion 160, with a grille 170 omitted for clarity.

Figure 1D:
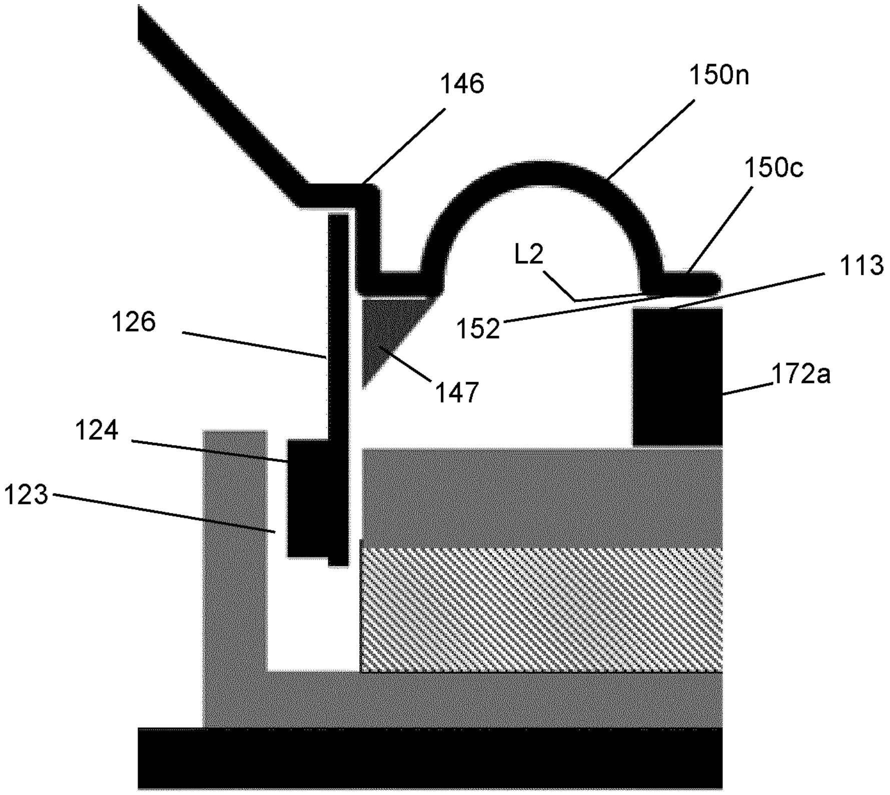

FIG. 1*d* shows a close up view of the first loudspeaker assembly 100 in the vicinity of the inner suspension portion 150, with a grille 170 and a head of a pin 172 omitted for clarity.

The drive unit is an electromagnetic drive unit that includes the magnet unit 122, which includes a washer 122*a*, magnet 122*b* and U-yoke 122*c*. The magnet unit 122 is configured to produce a magnetic field in an air gap 123, and a voice coil 124 attached to the diaphragm 130 via a voice coil former 126, wherein the voice coil 124 is configured to sit in the air gap 123 when the diaphragm 130 is at rest. When the loudspeaker assembly 100 is in use, the voice coil 124 may be energized (have a current passed through it) to produce a magnetic field which interacts with the magnetic field produced by the magnet unit 122 and which causes the voice coil 124 (and therefore the cone portion 140 of the diaphragm 130) to move relative to the magnet unit. Such drive units are well known.

The drive unit 120 is configured to move the cone portion 140 along a movement axis 102, wherein the cone portion 140 has a front face 142 that faces in a forwards direction F parallel to the movement axis 102 and a rear face 144 that faces in a rearwards R direction parallel to the movement axis 102. The body portion 140 is substantially rigid, in part due to its conical shape, which means it is able to move with piston-like movement as it is moved by the drive unit 120.

The outer suspension portion 160 is integral with the cone portion 140, and is attached to the chassis 110 at an attachment surface 162 on the outer suspension portion 160 and at a first landing surface 112 on the chassis 110 such that the cone portion 140 is suspended from the chassis 110 via the outer suspension portion 160. In this example, the first landing surface 112 is on the housing 111 (which, as noted above, is part of the chassis 110).

The attachment surface 162 on the outer suspension portion 160 includes a first attachment location L1 having a first position along the movement axis. The first attachment location L1 could be any location at which the outer suspension portion 160 attaches to the chassis 110.

In this example, the first attachment location L1 is a location within the attachment surface 162 on the outer suspension portion 160 at which there is a boundary between a clamped region 160*c* of the outer suspension portion 160 (whose movement is clamped by attachment to the chassis 110 as the cone portion 140 is moved along the movement axis 102 by the drive unit 120) and a non-clamped region 160*n* of the outer suspension portion 160 (which is not attached to the chassis 110 and thus is able to move as the cone portion is moved along the movement axis by the drive unit).

The inner suspension portion 150 is integral with the cone portion 140, and is attached to the chassis 110 at an attachment surface 152 on the inner suspension portion 150 and at a second landing surface 113 on the chassis 110 such that the cone portion 140 is suspended from the chassis 110 via the inner suspension portion 150.

In this example, the second landing surface 113 is on a spacer portion 172*a* which is included in (e.g. by being attached to or an integral part of) a pin 172. The pin 172 is attached to the magnet unit 122 and housing 111 as described in more detail below, and therefore the pin 172 and spacer portion 172*a* can be viewed as part of the chassis 110.

The attachment surface 152 on the inner suspension portion 100 includes a second location L2 having a second position along the movement axis. The second attachment location L2 could be any location at which the inner suspension portion 150 attaches to the chassis 110.

In this example, the second attachment location is a location L2 within the attachment surface 152 on the inner suspension portion 150 at which there is a boundary between a clamped region 150*c* of the inner suspension portion (whose movement is clamped by attachment to the chassis 110 as the cone portion 140 is moved along the movement axis 102 by the drive unit 120) and a non-clamped region 150*n* of the inner suspension portion 150 (which is not attached to the chassis 110 and thus is able to move as the cone portion is moved along the movement axis by the drive unit).

In this example, the cone portion 140 extends between a first plane P1 which is perpendicular to the movement axis 102 and which passes through the first attachment location L1, and a second plane P2 which is perpendicular to the movement axis 102 and which passes through the second attachment location L2.

Advantageously, the first position along the movement axis is separated from the second position along the movement axis by a distance h. This distance h corresponds to the distance between the first plane P1 and the second plane P2 as shown in FIG. 1*a*.

This separation h between the first attachment location L1 and the second attachment location L2 along the movement axis helps to inhibit rocking motion of the cone portion 140 when the loudspeaker assembly 100 is in use, without the need for a damper.

The cone portion 140 thus includes a voice coil connection portion 146, which is shaped (in this example, with a right-angle corner region) to facilitate an attachment between the cone portion 140 and the voice coil former 126. The voice coil former 126 is attached to the voice coil connection portion 146 by adhesive 147, and suspends the windings of the voice coil 124 in the air gap 123, and allows movement of the voice coil 124 and cone portion 140 along the movement axis 102.

In this example, the effective radiating area of the cone portion 140 projected onto the plane P1 (which is a plane perpendicular to the movement axis 102) is 64.7 $cm^2$, which is larger than the sum of the effective radiating area of the inner suspension portion 150 (7 $cm^2$) and the effective radiating area of the outer suspension portion 160 (16.6 $cm^2$) projected onto the same plane. These effective radiating areas were calculated as being the area of an annular region of the diaphragm which extends from a middle of the inner half roll suspension to a middle of the outer half roll suspension, as projected onto a plane perpendicular to the movement axis.

The inner suspension portion 150 comprises a single U-shaped (curved) corrugation, convex with respect to the forward direction F, which extends around the outer perimeter of the cone portion 140. This U-shaped form of suspension element is sometimes known as a surround.

However, the inner suspension portion 150, located between d and VCd, may have a variety of forms which allow axial motion, such as a positive half roll, a negative half roll, an s-shape or any combination of tangential corrugations. Some examples are shown in FIGS. 3-7.

The attachment surface on the inner suspension portion 150 may include a flat portion approaching the movement axis leading to a flat portion perpendicular to the principle axis for bonding to a fixed member of the loudspeaker.

The outer suspension portion 160 comprises a single U-shaped (curved) corrugation, convex with respect to the forward direction F, which extends around the movement axis 102. This U-shaped form of suspension element is sometimes known as a surround.

In use, the inner suspension portion 150 and the outer suspension portion 160 deform during motion of the voice coil 124 and diaphragm and provide an axial stiffness while effectively preventing radial motion and rocking of the moving assembly.

In this example, the chassis 110 includes a grille 170 positioned in front of the diaphragm 130. The grille used here is a cone-shaped grille that includes contours which follow the contours of the cone portion of the diaphragm.

A rear face of the grille 170 faces in the rearwards direction R toward the front face 142 of the cone portion 140, and a front face of the grille 170 faces in the forwards direction F. The grille 170 is configured to permit sound produced by the front face 142 of the cone portion 140 to pass through the grille 170 when the loudspeaker is in use, and to inhibit the ingress of water incident on the front face of the grille 170 from entering into a space enclosed between the rear face of the grille 170 and the front face 142 of the cone portion 140.

In this example, the grille 170 is rigidly attached to the magnet unit 122 and housing 111 via the pin 172 which passes through a preformed hole 154 in the inner suspension portion 150 of the diaphragm 130 and a preformed hole in the magnet unit 122. This strengthens the grille 170 in the vicinity of a centre of the diaphragm 130 (where loudspeaker grilles are typically lacking in rigidity). This helps to improve the rigidity of the loudspeaker assembly 100 as a whole.

The preformed hole 154 in the inner suspension portion 150 also helps to radially align the diaphragm 130 relative to the magnet unit 122 during assembly.

As noted above, a spacer portion 172*a* of the pin 172 provides the second landing surface 113 on the chassis 110.

In this example h is 20 mm.

In this example, the longest dimension of a non-clamped region of the outer suspension portion 160 in a direction perpendicular to the movement axis 102, D_clamp is 115 mm, and the voice coil has an innermost diameter of VCd=38.55 mm, such that D_clamp≥2VCd.

A centre fixation diameter d=10 mm, which is less than VCd, this is the longest dimension of a clamped region of the inner suspension portion in a direction perpendicular to the movement axis, and thus extends between two points on a boundary between a region of the clamped region of the inner suspension portion and a non-clamped region of the inner suspension portion. Outside of the diameter d, the inner suspension portion is able to move In this example, the diaphragm 130 is made of a single piece of material, which is Glasfiber+Epoxy having a uniform thickness t=0.15 mm. This material happens to be non-transparent, but other materials (transparent and non-transparent) are possible. A transparent material may assist with manufacture.

A number of different materials which may be used for the diaphragm have already been listed above, and several possible materials are listed earlier in this disclosure In other examples (not shown), the diaphragm 130 may be formed of paper.

In other examples (not shown), the diaphragm 130 can be generated by an injection moulding process allowing for more design freedom. Such a technique may be used, for example, to increase thickness in the cone portion (see e.g. FIG. 3*c* and FIG. 5 discussed below), or to form local features such as stiffening elements which may e.g. take the form of radial or circumferential ribs or indentations (see e.g. FIGS. 3*a*-*b* discussed below) to shape the frequency response.

The loudspeaker has a diameter D=115 mm, voice coil diameter VCd=38.55 mm, center fixation diameter d=10 mm and height h of 20 mm.

In more detail, the diaphragm 130 is made from a single ply of canvas woven glass fibre embedded in an Epoxy matrix heat cured under pressure to the desired shape. The resulting thickness is 0.15 mm. The bulk density is 1400 kg/m^3. In a dynamical, mechanical analysis of samples of the material the Young's Modulus and Storage Modulus according to ISO6721-4 are 4.5 GPa and 0.15 GPa respectively. On samples punched from the body portion with the fibres aligned with the pulling direction the static Young's modulus according to ISO527-1 is 6.2 GPa, when the fibre direction is under 45 deg relative to the pulling direction the Young's Modulus is 4.5 GPa. The corresponding tensile strength is 203 MPa and 60 MPa for the respective fibre alignment directions. The material is stable over temperature and no glass transition is observed up to 280 degC.

The first loudspeaker assembly 100 improves on earlier loudspeaker designs, by combining many advantages of such earlier designs. For example, a large diaphragm 130 with a cone portion 140 allows for high loudspeaker sensitivity making it energy efficient and suitable for mid to low frequency reproduction. As the cone portion 140 is much larger in radiating surface area compared to the suspension areas it does not suffer from high 2nd order harmonic distortion.

Moreover, the first loudspeaker assembly 100 has two suspension portions 150, 160, acting in two planes P1, P2 at substantial distance h apart along the movement axis 102. This allows for stable axial motion effectively preventing rocking. Both suspension portion 150, 160 are integrally connected to the cone portion 140 and hence can be integrally formed in a single operation. This makes the design particularly suitable for low-cost application in which the diaphragm 130 may be generated by means of vacuum forming or thermo forming from a sheet material. Integrally forming the diaphragm 130 from a single piece of material further decreases potential water ingress compared with traditional loudspeaker designs having glued joints between diaphragm, surround and dustcap. At its centre, the loudspeaker assembly 100 is not moving, and so the protection grille 170 can be fixed to the magnet unit 122 and housing 111 resulting in an exceptionally stiff and robust loudspeaker assembly 100 for used in harsh environmental outdoor conditions.

As the diaphragm 130 is formed from a single piece of material, no weight is added by glue joints as in a traditional loudspeakers where the surround and damper are bonded to the diaphragm or voice coil by means of an adhesive.

By forming the inner and outer suspension portions 150, 160 with the diaphragm 130 and so avoiding the need for a damper, the loudspeaker uses the minimal number of moving components just like a tweeter but with a much wider frequency range. This makes the design suitable for low cost applications and lean manufacturing on fully automated production lines.

This provides for a loudspeaker assembly which is particularly well suited for use outdoors (particularly in an AVAS).

The loudspeaker may have a resonance frequency within the range 400 Hz to 800 Hz. This is a relatively high resonance frequency for a broadband loudspeaker (e.g. for an AVAS application), but can be very useful, noting that the resonance frequency may be tuned to the frequency range where the fundamentals of audible warning signals lie (typically 400 to 600 Hz), decreasing the real power at the speaker in this range due to the impedance peak around resonance. Despite the high resonance frequency, the output at lower frequencies such as the 315 Hz ⅓rd octave band can still be substantial due to a high loudspeaker sensitivity.

FIGS. 2*a*-*f* show a method of forming the loudspeaker assembly 100 of FIG. 1*a*.

Figure 2A:
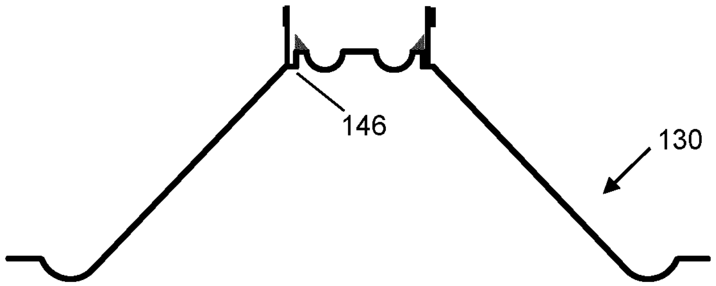
FIGS. 2*a-f* show a method of forming the loudspeaker assembly 100 of FIG. 1*a.*

After pre-forming the diaphragm 130 from a single piece of material, the voice coil former and voice coil are attached to the voice coil connection portion 146 by adhesive (FIG. 2*a*).

Figure 2B:
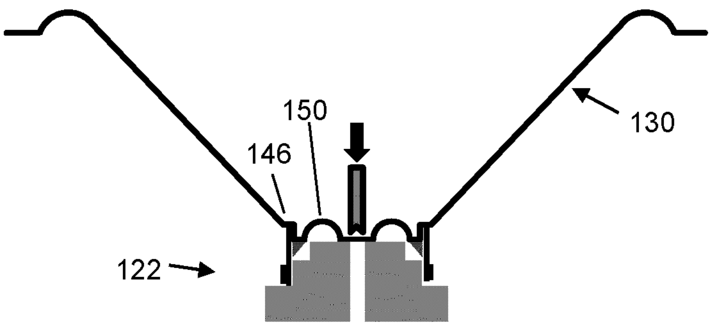

Next, a tool is used to pierce a concentric hole relative to the inside diameter of the voice coil in the diaphragm inside of the inner suspension portion 150, with a pre-formed hole in the magnet unit 122 being used for alignment (FIG. 2*b*).

Figure 2C:
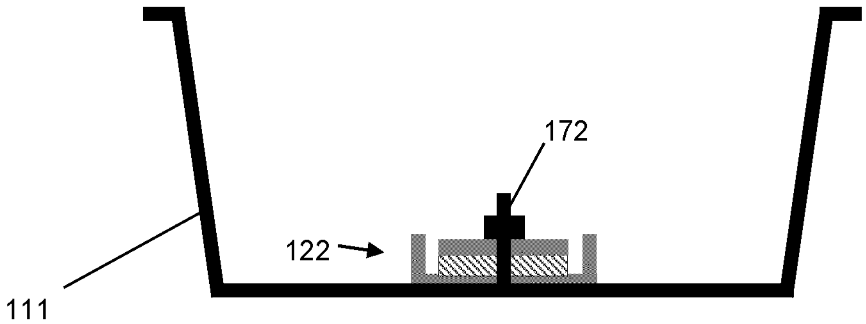

Next, the pin 172 (with its spacer portion 172*a*) is rigidly attached by adhesive to the housing 111 and magnet unit 122 by glue (FIG. 2*c*).

Figure 2D:
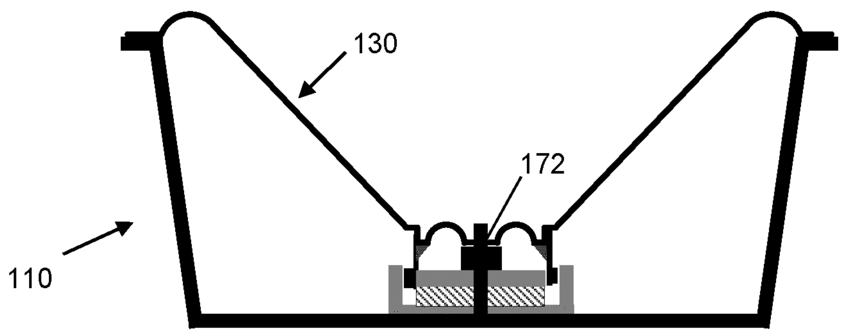

Next, the diaphragm 130 is attached to the first and second landing surface on the chassis 110 by adhesive (FIG. 2*d*).

Figure 2E:
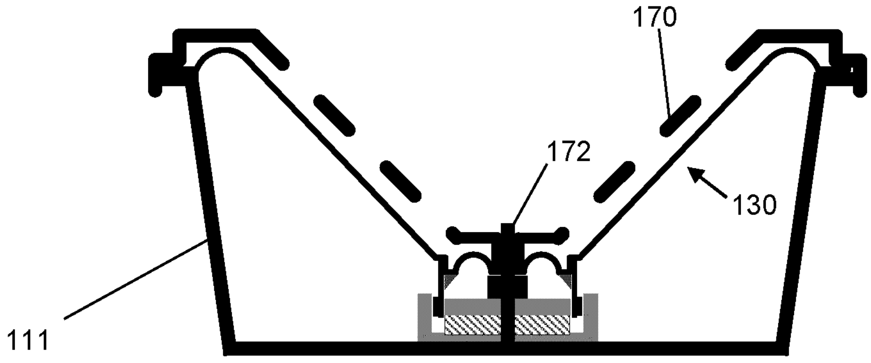

Next, the grille 170 is mounted on top of the housing 111, clamping down on the outer edge of the diaphragm 130, (FIG. 2*e*).

Figure 2F:
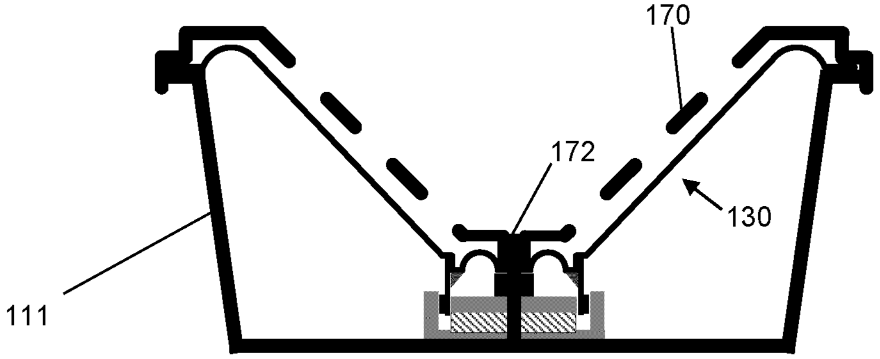

Next, the pin 172 is heat staked to the protection grille 170 forming a strong bond between the housing 111 and the protection grille 170 (FIG. 2*f*).

Because the grille 170 is joined to the magnet system and back of the housing, this stiffens the assembly and allows for usage of thin wall thickness and fewer ribs in the housing.

FIGS. 3*a-e* show variations that might be implemented in the loudspeaker assembly of FIG. 1*a*.

Figure 3A:
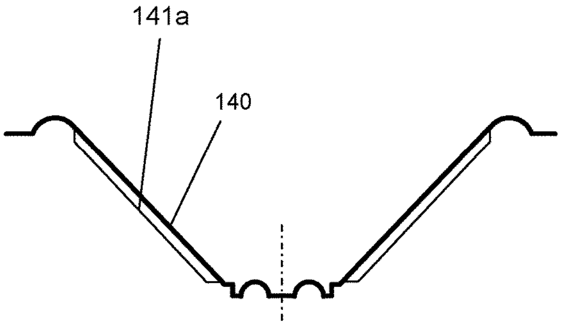
FIGS. 3*a-e* show variations that might be implemented in the loudspeaker assembly of FIG. 1*a.*

In FIG. 3*a*, the cone portion 140 of the diaphragm 130 has been modified to include additional stiffening elements, in the form of radially extending ribs 141*a*, so as to increase stiffness of the body portion relative to the inner and/or outer suspension portions.

Figure 3B:
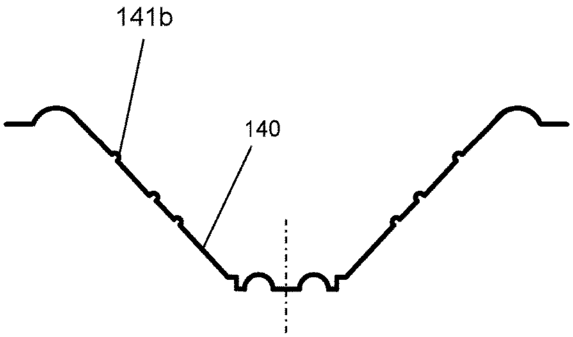
Figure 3C:
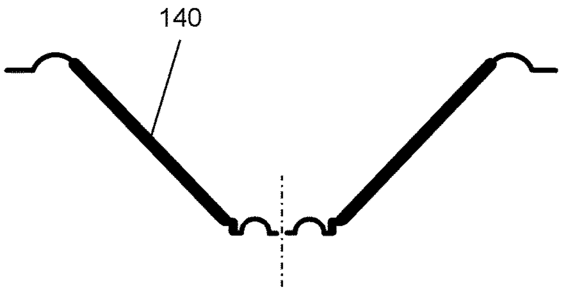

In FIG. 3*b*, the cone portion 140 of the diaphragm 130 has been modified to include additional stiffening elements, in the form of circumferentially extending ribs 141*b*, so as to increase stiffness of the body portion relative to the inner and/or outer suspension portions In FIG. 3*c*, the cone portion 140 of the diaphragm 130 has been modified to be thicker than the inner and outer suspension portions, so as to increase stiffness of the body portion relative to the inner and/or outer suspension portions.

Figure 3D:
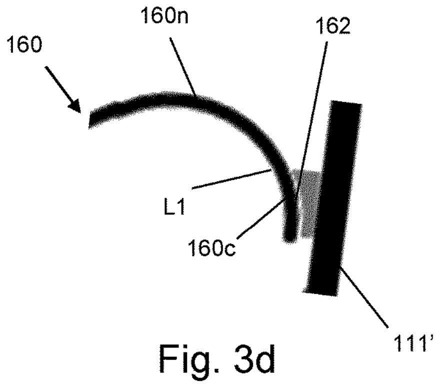

In FIG. 3*d*, the attachment between the outer suspension portion 160 and a housing 111 is modified, so that the attachment surface 162 on the outer suspension portion 160 and the first landing surface on the housing 111' are not in a plane perpendicular to the movement axis.

Thus, for the arrangement of FIG. 3*d*, the attachment surface 162 on the outer suspension portion 160 includes first attachment locations having different positions along the movement axis 102.

In some examples, the first attachment location L1 may be taken as any location within this attachment surface 162.

Preferably, the first attachment location L1 is defined as a location within the attachment surface 162 at which there is a boundary between a clamped region 160*c* of the outer suspension portion 160 (whose movement is clamped by attachment to housing 111) and a non-clamped region 160*n* of the outer suspension portion 160 which is not attached to the housing 111 and thus is able to move as the cone portion (not shown) is moved along the movement axis by the drive unit (not shown).

Figure 3E:
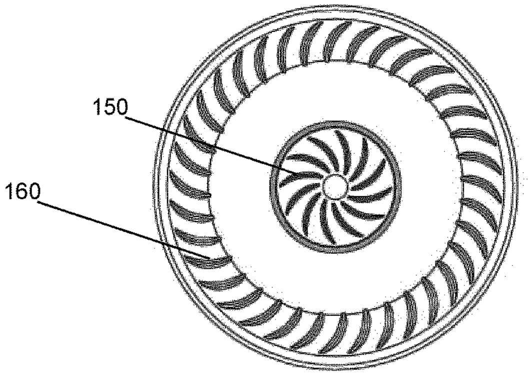

In FIG. 3*e*, the diaphragm has integral pleats in the inner and outer surround portions 150, 160.

The pleats are configured to partially close and allow for deformation of the inner and outer surround portions 150, 160 without buckling. Note that a traditional rubber surround is configured to compress radially when the cone body is moved downwards. This is easily possible with rubber due to the high Poisson's ratio and low stiffness of rubber. However, a surround formed from a material that can allow piston-like movement of a body portion (e.g. a polymer or composite) may cause buckling in the inner and/or outer suspension portion formed of the same material, when the body portion is pushed downwards beyond a certain limit.

Figure 3F:
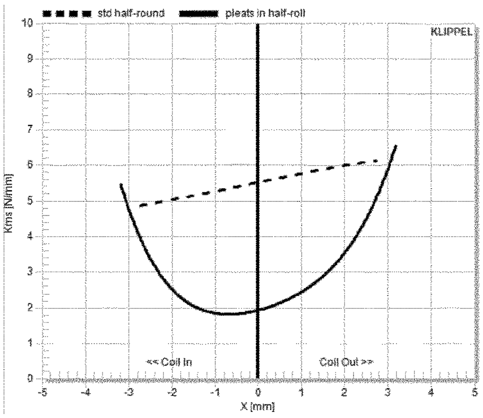
FIG. 3*f* shows a graph relating to the various shown in FIG. 3*e.*

FIG. 3*f* shows the effect of adding pleats in both the inner and outer suspension portions relative to a reference speaker with the same diaphragm material and same half roll suspension shapes but without the pleats. The stiffness Kms vs displacement curves are shown. Without pleats (dashed curve) the stiffness is high but linear with respect to excursion until buckling occurs (not shown in this graph). With pleats (solid line), the stiffness is much lower but progressive. Ideally a compromise is chosen which results in suitable stiffness at rest position with suitable linearity avoiding buckling within the intended excursion range In the discussions of further loudspeaker assemblies that follow, alike features have been given alike reference numbers, and are not discussed in further detail except where that would provide additional insight.

Figure 4:
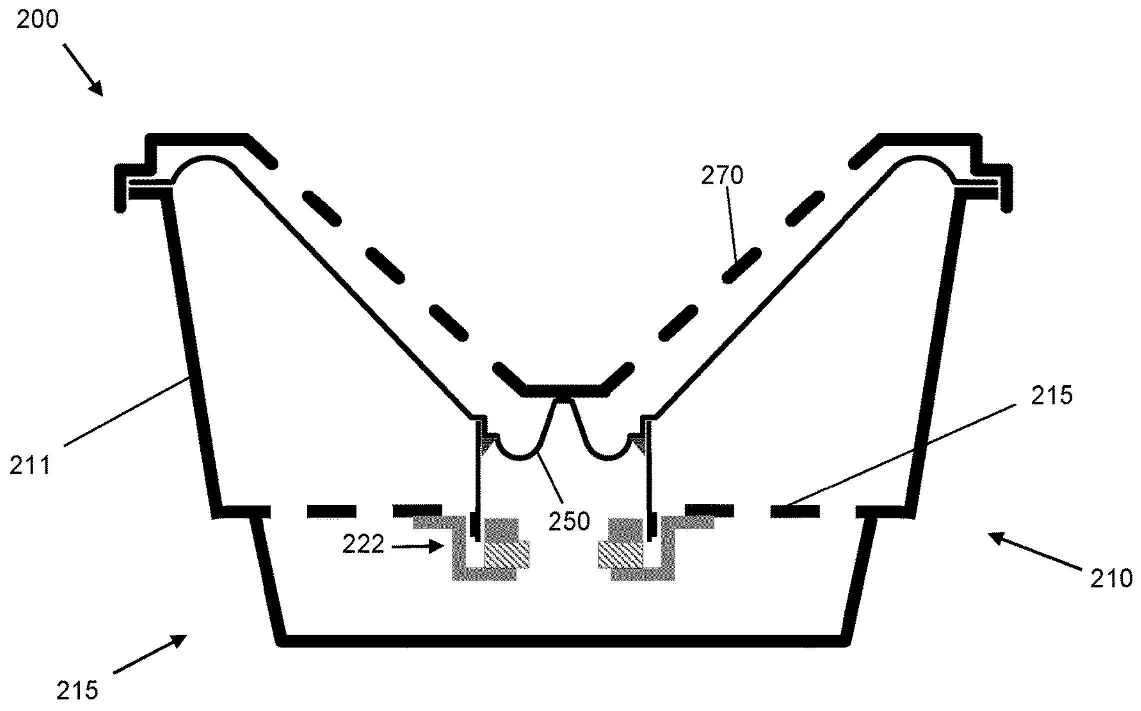
FIG. 4 shows a second loudspeaker assembly.

FIG. 4 shows a second loudspeaker assembly 200.

In this example, a magnet unit 222 is rigidly attached to a housing 211 by an internal frame 215 which forms part of the housing 211. The chassis 210 includes the housing 211 (including the frame 215) and the grille 270.

In this example, the inner suspension portion 250 is attached to the grille 270, with no pin being used to provide an attachment between the grille 270 and the housing 211 or magnet unit 22.

Figure 5:
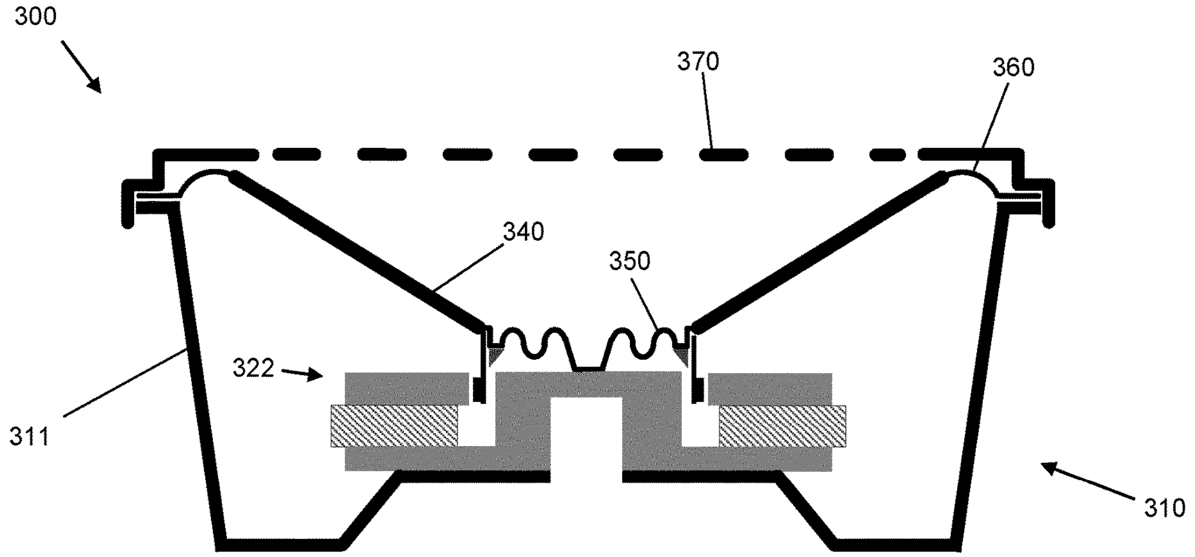
FIG. 5 shows a third loudspeaker assembly.

FIG. 5 shows a third loudspeaker assembly 300.

In this example, a magnet unit 322 is rigidly attached to a housing 311 directly. A chassis 310 includes the housing 311, the magnet unit 322, and a grille 370.

In this example, the grille 370 is flat.

In this example, a cone portion 340 of the diaphragm has been modified to be thicker than the inner and outer suspension portions 350, 360.

In this example, the inner suspension portion 350 is attached directly to the magnet unit 322 (which is part of the chassis, because it is rigidly attached to the housing).

Figure 6A:
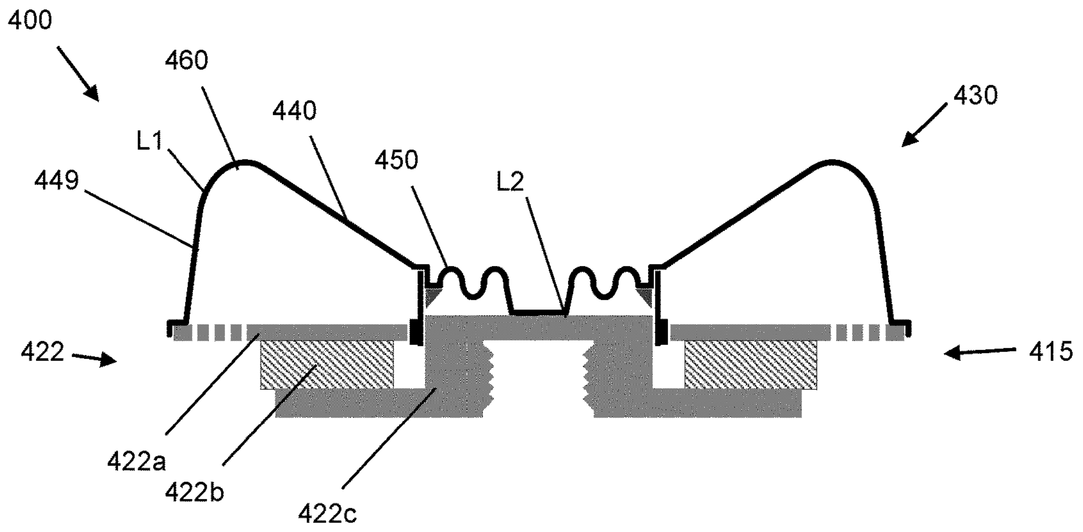
FIG. 6*a* shows a fourth loudspeaker assembly.

FIG. 6*a* shows a fourth loudspeaker assembly 400.

In this example, the housing, frame and grille are omitted and the chassis is instead provided by a magnet unit 422 and a substantially rigid chassis portion 449 of the diaphragm 430. No housing/frame is required.

In this example, the chassis portion 449 of the diaphragm 430 is integrally formed with the outer suspension portion 460 of the diaphragm 430. Thus, the chassis portion 449 is part of the diaphragm 430. Because the chassis portion 449 is substantially rigid, it substantially retains its shape (see FIG. 6*b*) as the body portion 440 is moved along the movement axis by the drive unit.

In this example, the first attachment location L1 (at which the outer suspension portion 460 attaches to the chassis) may be a location at a boundary between the outer suspension portion (which deforms as the body portion is moved along the movement axis by the drive unit) and the chassis portion (which substantially retains its shape as the body portion is moved along the movement axis by the drive unit).

Thus, the chassis portion 449 helps to provide a separation between the first attachment location L1 and the second attachment location L2.

In other examples (not shown), the chassis portion of the diaphragm may be replaced by a rigid frame, or rigid projection of the magnet unit.

In this example, the magnet unit has a washer 422*a*, an annular magnet 422*b* and a T-yoke 422*c*.

The magnet unit 422 may, for example, be configured to be mounted in a separate mounting body (such as a loudspeaker cabinet, such as a car door).

In this example, the inner and outer suspension portions 450, 460 are attached directly to the magnet unit.

Figure 6B:
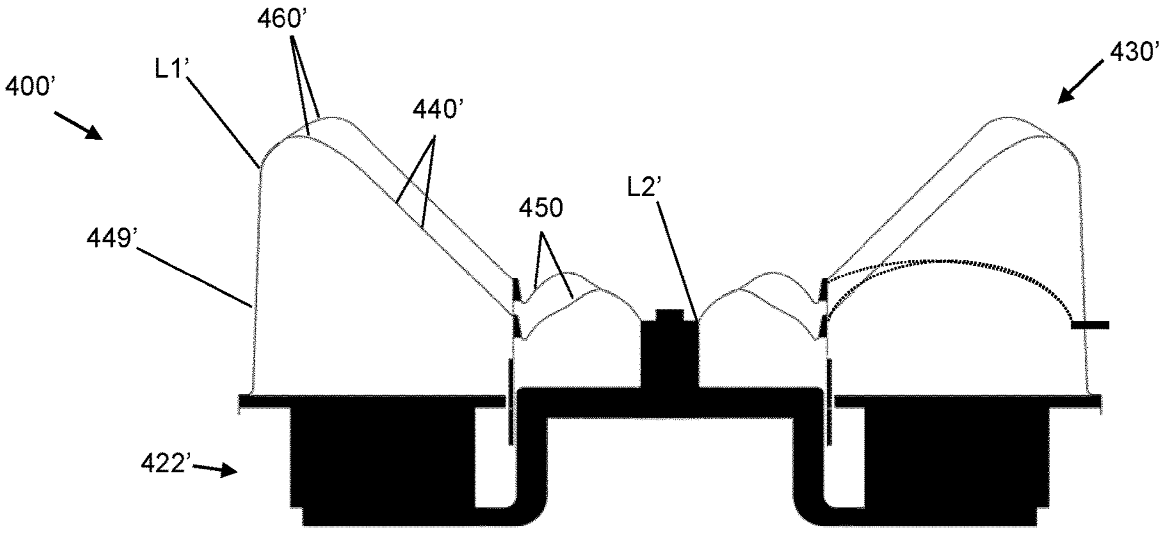
FIG. 6*b* shows the result of a finite element simulation of a loudspeaker following the same design strategy as the loudspeaker shown in FIG. 6*a.*

The washer 422*a* may optionally be ventilated (e.g. with holes along the outside of the magnet unit 422, as shown in FIG. 6*a*) or can be closed to create a sealed loudspeaker (as shown in FIG. 6*b*).

The configuration shown in FIGS. 6*a*-*b* allows for low-cost assemblies on small speakers with relatively speaking low resonance frequency, but still having all the benefits of a double suspension.

Fixation of the loudspeaker to a separate mounting body (e.g. housing) can be done via thread formed on the back side of the T-yoke 422*c*, as shown in FIG. 6*a*.

FIG. 6*b* shows the result of a finite element simulation of a loudspeaker 400' following the same design strategy as the loudspeaker 400 shown in FIG. 6*a*. There are two lines representing the deformed diaphragm 430' in the most forward and most rearward positions during normal loudspeaker operation.

As can be seen, the upstanding chassis portion 449' of the diaphragm 430' substantially retains its shape for the most forward and most rearward positions of the body portion 440', and consequently for any position in between the most forward and most rearward positions of the body portion 440'. The chassis portion 449' of the diaphragm 430' is very stiff due to its steep conical, almost cylindrical shape and may typically have a draft angle of ~2.5 deg allowing the diaphragm to be formed easily.

Since the chassis portion 449' remains substantially fixed during normal loudspeaker operation, it does not contribute to sound radiation, and permits the loudspeaker 400' to still benefit from the separated attachment locations L1, L2 which help to mitigate potential rocking motion and in turn help to ensure substantially axial motion of the body portion 440' and voice coil.

The chassis portion 449' fulfils the function of a frame or housing in that it connects the magnet unit 422' with the outer suspension portion 460'. As such, it can contain features typically associated with a frame such as a sealing towards a mounting environment or a connector for making the electrical connection between the voice coil's lead wires and an amplifier.

Figure 7:
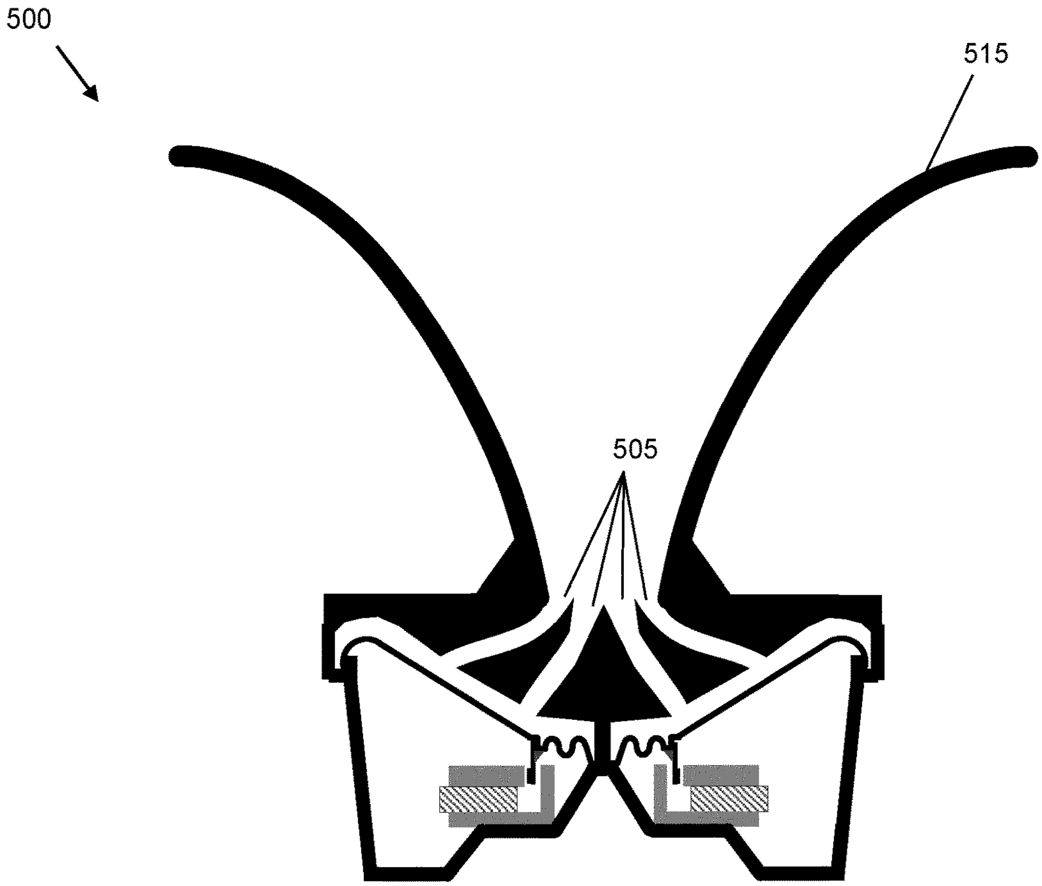
FIG. 7 shows a fifth loudspeaker assembly.

FIG. 7 shows a fifth loudspeaker assembly 500.

In this example, the loudspeaker assembly 500 is implemented as a compression driver, in which the diaphragm radiates into a chamber which leads via passages 505 to the mouth of a horn 515. As is known in the art, a compression driver is useful to increase the electroacoustic conversion efficiency, with the volume of the chamber preferably being as small as possible.

The acoustic properties of low moving mass, high resonance frequency and displacement of a loudspeaker assembly according to the invention are thought to be particularly useful for compression drivers.

In a compression driver implementation, the phase plug can have a central pin connecting it to the rear of the assembly. This ensures correct distance between the diaphragm and the phase plug which is important for consistent compression driver production and acoustic performance.

Figure 8:
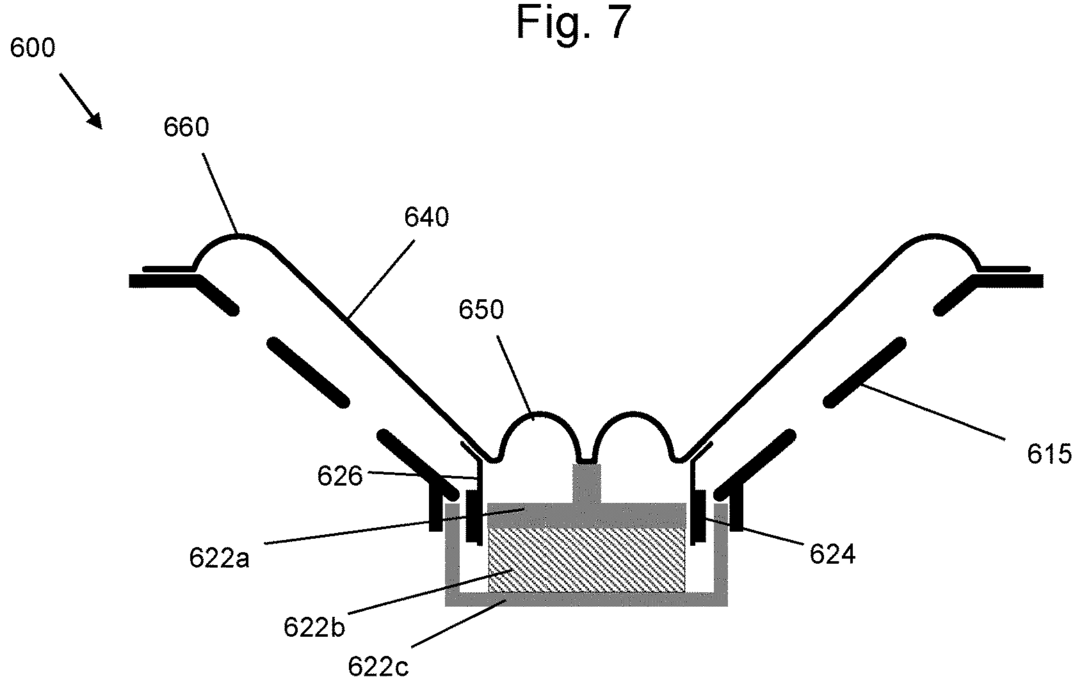
FIG. 8 shows a sixth loudspeaker assembly.

FIG. 8 shows a sixth loudspeaker assembly 600.

In this example, the loudspeaker assembly is intended to be a low cost assembly which uses a ferrite tablet as a magnet 622*b* inside a voice coil 624 in a U-yoke magnet system that includes washer 622*a*, the magnet 622*b* and U-yoke 622*c*. U-yoke magnet systems are known to have higher efficiency as compared to T-yoke magnet system, as there is almost no leakage of magnetic flux, since (almost) all flux is concentrated in the airgap.

In a traditional T-yoke loudspeaker it is possible to attach the outside diameter of a damper (sometimes referred to as a spider) to the washer of the magnet unit. However, in the more efficient U-yoke magnet systems this is not possible and so the frame needs a landing surface for the damper making it often complicated and needing a chassis with large amounts of plastic. However, in accordance with examples of the present invention, a damper landing surface is not required because a damper is not used in any of the illustrated embodiments of the present invention (see FIGS. 1-8).

A typical ferrite magnet material has a maximum energy product of no more than 30 kJ/m$^3$. In contrast, neodymium magnets as might be used in the arrangement of FIG. 1, have a maximum energy product of up to 400 kJ/m$^3$. Ferrite magnets are substantially cheaper than neodymium magnets, but because of their weaker magnetic flux, require substantially larger volume to be used to allow for useful loudspeaker output. In the example of FIG. 8, a larger voice coil diameter allows for more radial space to put the inner suspension and for a comparably large magnet 622*b*, so as to enable use of a ferrite tablet as the magnet 622*b*.

The flux of the ferrite tablet 622*b* only requires a U-yoke 622*c* with comparably small wall thickness to guide it to the airgap allowing it to be manufactured by a more expensive deep drawing process instead of cold forging—the typical process for thick U-yokes or T-yokes.

Due to the higher efficiency of the U-yoke magnet system, the configuration shown in FIG. 8 can be made lighter than a comparable T-yoke magnet system. This allows for a more lightweight frame further decreasing the total weight of the loudspeaker.

In this example, the voice coil former 626 has vertical cuts at top and the resulting crown shape is bent outwards. This allows for a large bonding surface to the body portion 640 when using an adhesive. If the voice coil former 626 is made by a thermoplastic material, it allows for heat-sealing the voice coil former 626 to a thermoplastic body portion 640, avoiding need to use any adhesive. Other joining processes, such as ultrasonic welding are also possible when implementing an annual energy director in the cone at the appropriate diameter.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A loudspeaker assembly, the loudspeaker assembly including:

- a chassis;
- a loudspeaker, including a drive unit and a diaphragm;
- wherein the diaphragm includes a body portion, an inner suspension portion and an outer suspension portion, wherein the body portion extends between the inner suspension portion and the outer suspension portion;
- wherein the drive unit is configured to move the body portion along a movement axis, wherein the body portion has a front face that faces in a forwards direction parallel to the movement axis and a rear face that faces in a rearwards direction parallel to the movement axis;
- wherein the outer suspension portion is integral with the body portion, and is attached to the chassis at a first attachment location such that the body portion is suspended from the chassis via the outer suspension portion, wherein the first attachment location has a first position along the movement axis;
- wherein the inner suspension portion is integral with the body portion, and is attached to the chassis at a second attachment location such that the body portion is suspended from the chassis via the inner suspension portion, wherein the second attachment location has a second position along the movement axis, wherein the inner suspension portion and the second attachment location are arranged radially inwardly of the body portion;
- wherein the first position along the movement axis is separated from the second position along the movement axis.

2. A loudspeaker assembly according to claim 1, wherein the body portion is a cone portion having a generally conical shape.

3. A loudspeaker assembly according to claim 1, wherein a convex face of the body portion faces in the forwards direction.

4. A loudspeaker assembly according to claim 1, wherein the first position along the movement axis is separated from the second position along the movement axis by a distance of at least 10 mm.

5. A loudspeaker assembly according to claim 1, wherein the outer suspension portion and inner suspension portion are the only suspension elements via which the body portion is suspended from the chassis.

6. A loudspeaker assembly according to claim 1, wherein the diaphragm and the chassis are separate elements, with the outer suspension portion being attached to the chassis at one or more first attachment surfaces on the outer suspension portion, and with the inner suspension portion being attached to the chassis at one or more second attachment surfaces on the inner suspension portion.

7. A loudspeaker assembly according to claim 1, wherein the diaphragm includes a substantially rigid chassis portion which is part of the chassis, wherein the chassis portion of the diaphragm is integrally formed with the outer suspension portion such that the body portion is suspended from the chassis portion by the outer suspension portion.

8. A loudspeaker assembly according to claim 1, wherein the effective radiating area of the body portion projected onto a plane perpendicular to the movement axis is larger than the sum of the effective radiating area of the inner suspension portion and the effective radiating area of the outer suspension portion projected onto the same plane.

9. A loudspeaker assembly according to claim 1, wherein the chassis includes a housing or a frame configured to be mounted in a separate mounting body.

10. A loudspeaker assembly according to claim 1, wherein the chassis includes only a magnet unit and a chassis portion of the diaphragm.

11. A loudspeaker assembly according to claim 1, wherein the chassis includes a grille positioned in front of the diaphragm.

12. A loudspeaker assembly according to claim 11, wherein the inner suspension portion and the chassis are separate elements with the inner suspension portion being attached to the chassis at one or more second landing surfaces on the grille.

13. A loudspeaker assembly according to claim 1, wherein a Young's modulus of the material of the diaphragm is in the range 0.5 GPa to 15 GPa.

14. A loudspeaker assembly according to claim 1, wherein the diaphragm is thermoformed, or vacuum formed, from a thermoplastic.

15. A loudspeaker assembly according to claim 1, wherein the material of the diaphragm is thicker in the body portion compared with the inner suspension portion and/or outer suspension portion.

16. A loudspeaker assembly according to claim 11, wherein the grille is attached to the chassis via an element that passes through the inner suspension portion.

17. A loudspeaker assembly according to claim 16, wherein the loudspeaker assembly is configured for use with the front face of the body portion exposed to an outdoor environment.

18. A loudspeaker assembly according to claim 1, wherein a Young's modulus of the material of the diaphragm is in the range 8 GPa to 15 GPa.

* * * * *